(12) United States Patent
Du et al.

(10) Patent No.: US 12,229,215 B2
(45) Date of Patent: Feb. 18, 2025

(54) PERFORMING MATRIX MULTIPLICATION IN A STREAMING PROCESSOR

(71) Applicant: QUALCOMM Incorporated, San Diego, CA (US)

(72) Inventors: Yun Du, San Diego, CA (US); Gang Zhong, San Diego, CA (US); Fei Wei, San Diego, CA (US); Yibin Zhang, San Diego, CA (US); Jing Han, San Jose, CA (US); Hongjiang Shang, San Diego, CA (US); Elina Kamenetskaya, Belmont, MA (US); Minjie Huang, San Diego, CA (US); Alexei Vladimirovich Bourd, San Diego, CA (US); Chun Yu, Rancho Santa Fe, CA (US); Andrew Evan Gruber, Arlington, MA (US); Eric Demers, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/487,918

(22) Filed: Oct. 16, 2023

(65) Prior Publication Data

US 2024/0037183 A1    Feb. 1, 2024

Related U.S. Application Data

(63) Continuation of application No. 17/137,226, filed on Dec. 29, 2020, now Pat. No. 11,829,439.
(Continued)

(51) Int. Cl.
*G06F 17/16* (2006.01)
*G06F 7/57* (2006.01)
(Continued)

(52) U.S. Cl.
CPC .............. *G06F 17/16* (2013.01); *G06F 7/57* (2013.01); *G06F 9/30036* (2013.01); *G06F 9/3851* (2013.01); *G06F 9/3887* (2013.01)

(58) Field of Classification Search
CPC .......... G06F 17/16; G06F 7/57; G06F 9/3826; G06F 9/3851; G06F 9/30043; G06F 9/3001; G06F 9/30036; G06F 9/3887
See application file for complete search history.

(56) References Cited

U.S. PATENT DOCUMENTS

2007/0271325 A1\* 11/2007 Juffa ................... G06F 17/16
                                                            708/607
2008/0301694 A1    12/2008 Mattson
(Continued)

FOREIGN PATENT DOCUMENTS

CN        108604216 A      9/2018
TW        201626265 A      7/2016
WO    WO-2009145917 A1 \* 12/2009  ............. G06F 15/16

OTHER PUBLICATIONS

International Preliminary Report on Patentability—PCT/US2020/067581 The International Bureau of WIPO—Geneva, Switzerland, Jul. 14, 2022.
(Continued)

*Primary Examiner* — Farley Abad
(74) *Attorney, Agent, or Firm* — Procopio, Cory, Hargreaves & Savitch

(57) ABSTRACT

The present disclosure relates to methods and apparatus for compute processing. For example, disclosed techniques facilitate improving performance of matrix multiplication in streaming processor. Aspects of the present disclosure can execute, with a load control unit, a first load instruction to load a set of input data of an input matrix from a first memory to a second memory. Aspects of the present disclosure can also execute, with the load control unit, a second
(Continued)

load instruction to load a set of weight data of a weight matrix from the first memory to the second memory. Additionally, aspects of the present disclosure can perform, with an ALU component, a matrix multiplication operation using the set of input data and the set of weight data to generate an output matrix. Further, aspects of the present disclosure can store the output matrix at a general purpose register accessible to the ALU component.

18 Claims, 6 Drawing Sheets

Related U.S. Application Data

(60) Provisional application No. 62/955,311, filed on Dec. 30, 2019.

(51) Int. Cl.
*G06F 9/30* (2018.01)
*G06F 9/38* (2018.01)

(56) References Cited

U.S. PATENT DOCUMENTS

| | | | |
|---|---|---|---|
| 2012/0133654 A1* | 5/2012 | Redgrave | G06F 8/4442 |
| | | | 345/522 |
| 2015/0379680 A1* | 12/2015 | Du | G06T 1/60 |
| | | | 345/426 |
| 2018/0157465 A1 | 6/2018 | Bittner et al. | |
| 2018/0307980 A1 | 10/2018 | Barik et al. | |
| 2019/0026250 A1 | 1/2019 | Das Sarma et al. | |
| 2019/0303167 A1 | 10/2019 | Hughes et al. | |
| 2019/0324746 A1 | 10/2019 | Maiyuran et al. | |
| 2020/0051317 A1 | 2/2020 | Muthler et al. | |
| 2020/0349047 A1 | 11/2020 | Faibish et al. | |
| 2020/0394041 A1* | 12/2020 | Lueh | G06F 9/5022 |
| 2021/0027156 A1* | 1/2021 | Zhu | G06N 3/08 |
| 2021/0124794 A1* | 4/2021 | Nair | G06F 17/153 |
| 2021/0200836 A1 | 7/2021 | Du | |

OTHER PUBLICATIONS

International Search Report and Written Opinion—PCT/US2020/067581—ISA/EPO—Apr. 20, 2021.
Taiwan Search Report—TW109146852—TIPO—Jul. 2, 2024.

* cited by examiner

| | | | |
|---|---|---|---|
| 00 | 01 | 02 | 03 |
| 10 | 11 | 12 | 13 |
| 20 | 21 | 22 | 23 |
| 30 | 31 | 32 | 33 |

304 — Columns_b / Rows_b

| | | | |
|---|---|---|---|
| AA00 + AB10 + AC20 + AD30 | AA01 + AB11 + AC21 + AD31 | AA02 + AB12 + AC22 + AD32 | AA03 + AB13 + AC23 + AD33 |
| BA00 + BB10 + BC20 + BD30 | BA01 + BB11 + BC21 + BD31 | BA02 + BB12 + BC22 + BD32 | BA03 + BB13 + BC23 + BD33 |
| CA00 + CB10 + CC20 + CD30 | CA01 + CB11 + CC21 + CD31 | BA02 + BB12 + BC22 + BD32 | CA03 + CB13 + CC23 + CD33 |
| DA00 + DB10 + DC20 + DD30 | DA01 + DB11 + DC21 + DD31 | BA02 + BB12 + BC22 + BD32 | DA03 + DB13 + DC23 + DD33 |

306, 306a, 306b — Columns_b / Rows_a

| | | | |
|---|---|---|---|
| AA | AB | AC | AD |
| BA | BB | BC | BD |
| CA | CB | CC | CD |
| DA | DB | DC | DD |

302 — Columns_a / Rows_a

FIG. 3

PERFORMING MATRIX MULTIPLICATION IN A STREAMING PROCESSOR

CROSS REFERENCE TO RELATED APPLICATION(S)

This application is a Continuation of U.S. Non-provisional patent application Ser. No. 17/137,226, entitled "Methods and Apparatus to Perform Matrix Multiplication in a Streaming Processor," and filed on Dec. 29, 2020, which claims the benefit of U.S. Provisional Patent Application Ser. No. 62/955,311, entitled "Methods and Apparatus to Perform Matrix Multiplication in a Streaming Processor," and filed on Dec. 30, 2019, which are expressly incorporated by reference herein in their entirety.

TECHNICAL FIELD

The present disclosure relates generally to processing systems and, more particularly, to one or more techniques for compute processing.

INTRODUCTION

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A central processing unit (CPU) may control the operation of the GPU by issuing one or more graphics processing commands to the GPU. Modern day CPUs are typically capable of concurrently executing multiple applications, each of which may need to utilize the GPU during execution.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a display processor, a display processing unit (DPU), a graphics processing unit (GPU), or a video processor. The apparatus can execute, with a load control unit of a streaming processor, a first load instruction to load a set of input data of an input matrix from a first memory to a second memory of the streaming processor, the input matrix comprising a first number of rows and a first number of columns. The apparatus can also execute, with the load control unit, a second load instruction to load a set of weight data of a weight matrix from the first memory to the second memory, the weight matrix comprising a second number of rows and a second number of columns. Additionally, the apparatus can perform, with an arithmetic logic unit (ALU) component of the streaming processor, a matrix multiplication operation using the set of input data and the set of weight data to generate an output matrix having the first number of rows and the second number of columns, where each element of the output matrix represents a dot product of a plurality of elements of a row of the set of input data and a column of the set of weight data, and where the dot product includes a plurality of multiplication operations and accumulation operations that result in respective intermediate results that are re-input to the ALU component for a subsequent operation of the dot product. Further, the apparatus can store the output matrix at a general purpose register of the streaming processor, where the general purpose register is configured to be accessible to the ALU component.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 3 illustrates performing matrix multiplication, in accordance with one or more techniques of this disclosure.

DETAILED DESCRIPTION

Figure 1:
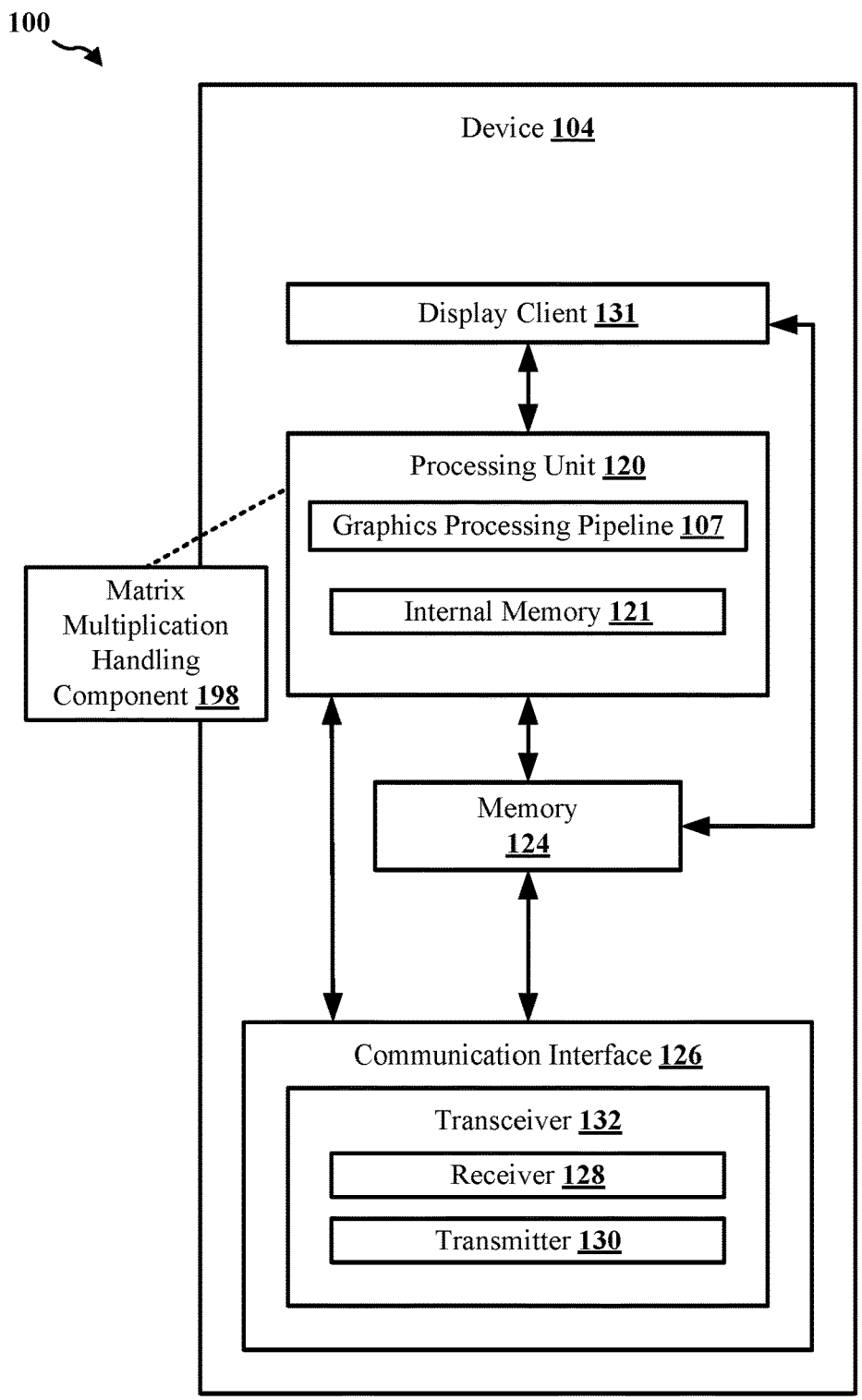
FIG. 1 is a block diagram that illustrates an example content generation system, in accordance with one or more techniques of this disclosure.

In general, matrix multiplication is a mathematical operation with a number of applications, including in applied mathematics, physics, engineering, and computer science. In the context of computer science, matrix multiplication may be used in applications, such as rendering three-dimensional (3D) graphics, training machine learning algorithms, and/or training artificial intelligence networks. However, the computational complexity of performing matrix multiplication operations may reduce the performance of such applications.

While some examples attempt to improve efficiency of performing matrix multiplication via hardware-based solutions (e.g., dedicated co-processors, matrix computation components, etc.), such hardware-based solutions may be costly in terms of resources, such as physical space within a device, and are generally limited in the range of operations that the hardware is able to perform.

Example techniques disclosed herein enable performing matrix multiplication using components available in a processor-based device. In particular, disclosed techniques may be implemented by processor-based devices that utilize parallel processing units, such as GPUs, that are configured to perform many operations in parallel (e.g., at the same time or at nearly the same time). For example, a graphics processor may include one or more processor cores (e.g., streaming processors) that execute instructions for one or more programs (e.g., "shader programs"). Although the following description provides examples for implementing one or more disclosed techniques with a graphics processor or a general purpose GPU (GPGPU), the concepts described herein may be applicable to other processor-based devices that employ parallel processing units and/or non-parallel processing units (e.g., a processing unit not configured to perform parallel processing).

In some examples, the graphics processor may be implemented with a single instruction, multiple data (SIMD) structure. In the SIMD structure, a streaming processor includes a plurality of processing elements that execute instructions of a same program but with different data. In some examples, particular instructions executing on a particular processing element may be referred to as a "fiber" or a "thread." Thus, while different processing elements of the streaming processor may be considered as performing different fibers, the different processing elements may still be performing the same particular instructions of a shader program. In this manner, the SIMD structure enables a graphics processor to perform many tasks in parallel (e.g., at the same time or at nearly the same time).

A matrix multiplication compute kernel (or primitive) may map one or more data outputs to a fiber, which represent a basic unit of a wave (sometimes referred to as a "warp"). A "chunk" of data outputs may map to a group of fibers, which may represent a wave (or warp). One or more waves may represent a workgroup, which represents a basic compute workload unit. However, in some examples, one input matrix, both input matrices, and/or the output matrix generated by performing the matrix multiplication may be large and be greater in size than resources available at the streaming processor. In some such examples, one or more of the input matrices and/or the output matrix may be split into slices (or "chunks") to fit into a compute kernel workgroup. In some examples, the size of the compute kernel workgroup may be based on physical resources of the streaming processor. For example, the size of the compute kernel workgroup may depend on a size of a general purpose register of the streaming processor, a size of a local buffer of the streaming processor, and/or the resources associated with a fiber.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, examples disclosed herein provide techniques for improving performance of operations in a graphics processor. Example techniques may improve the performance of performing matrix multiplication in a streaming processor of a graphics processor by reducing power consumption during the performing of matrix multiplication and/or by reducing the load of a processing unit (e.g., any processing unit configured to perform one or more techniques disclosed herein, such as a GPU, a DPU, and the like). For example, this disclosure describes techniques for system processing in any device that performs matrix multiplication. Other example benefits are described throughout this disclosure.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120 and a memory 124. In some examples, the device 104 can include a number of additional or alternative components, such as a communication interface 126, a transceiver 132, a receiver 128, a transmitter 130, and/or a display client 131.

The processing unit 120 may include an internal memory 121. The processing unit 120 may be configured to perform graphics processing, such as in a graphics processing pipeline 107. In some examples, the processing unit 120 may include a display processor to perform one or more display processing techniques on one or more frames generated by the processing unit 120 before presentment of the generated frame(s) by the display client 131. The display processor may be configured to perform display processing. For example, the display processor may be configured to perform one or more display processing techniques on one or more frames generated by the processing unit 120. The display processor may output image data to the display client 131 according to an interface protocol, such as, for example, the Mobile Industry Processor Interface Display Serial Interface (MIPI DSI).

The display client 131 may be configured to display or otherwise present frames processed by the processing unit 120 (and/or the display processor). In some examples, the display client 131 may include one or more of: a liquid crystal display (LCD), a plasma display, an organic light emitting diode (OLED) display, a projection display device, an augmented reality display device, a virtual reality display device, a head-mounted display, or any other type of display device.

Reference to the display client 131 may refer to one or more displays. For example, the display client 131 may include a single display or multiple displays. The display client 131 may include a first display and a second display. In further examples, the results of the graphics processing may not be displayed on the device. For example, the display(s) may not receive any frames for presentment thereon. Instead, the frames or graphics processing results may be transferred to another device. In some aspects, this can be referred to as split-rendering.

As disclosed above, the display client 131 may be configured in accordance with the MIPI DSI standard. The MIPI DSI standard supports a video mode and a command mode. In examples in which the display client 131 is operating in the video mode, the processing unit 120 (and/or the display processor) may continuously refresh the graphical content of the display client 131. For example, the entire graphical content may be refreshed per refresh cycle (e.g., line-by-line).

In examples in which the display client 131 is operating in the command mode, the processing unit 120 (and/or the display processor) may write the graphical content of a frame to a buffer. In some examples, the display client 131 may include the buffer and, thus, the buffer may represent memory local to the display client 131. In some such examples, the processing unit 120 (and/or the display processor) may not continuously refresh the graphical content of the display client 131. Instead, the processing unit 120 (and/or the display processor) may use a vertical synchronization (Vsync) pulse to coordinate rendering and consuming of graphical content at the buffer. For example, when a Vsync pulse is generated, the processing unit 120 (and/or the display processor) may output new graphical content to the buffer. Thus, the generating of the Vsync pulse may indicate when current graphical content at the buffer has been rendered.

Memory external to the processing unit 120, such as memory 124, may be accessible to the processing unit 120 and/or the display client 131. For example, the processing unit 120 may be configured to read from and/or write to external memory, such as the memory 124. The processing unit 120 and the display client 131 may be communicatively coupled to the memory 124 over a bus. In some examples, the processing unit 120, the memory 124, and the display client 131 may be communicatively coupled to each other over the bus or a different connection.

In some examples, the device 104 may include a content encoder/decoder configured to receive graphical and/or display content from any source, such as the memory 124 and/or the communication interface 126. The memory 124 may be configured to store received encoded content or decoded content. In some examples, the content encoder/decoder may be configured to receive encoded content or decoded content (e.g., from the memory 124 and/or the communication interface 126) in the form of encoded or decoded pixel data. In some examples, the content encoder/decoder may be configured to encode or decode any content.

The internal memory 121 and/or the memory 124 may include one or more volatile or non-volatile memories or storage devices. In some examples, the internal memory 121 and/or the memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 and/or the memory 124 may be a non-transitory storage medium according to some examples. The term "non-transitory" may indicate that the storage medium is not embodied in a carrier wave or a propagated signal. However, the term "non-transitory" is not be interpreted to mean that the internal memory 121 and/or the memory 124 is non-movable or that its contents are static. As one example, the memory 124 may be removed from the device 104 and moved to another device. As another example, the memory 124 may not be removable from the device 104.

The processing unit 120 may be a CPU, an application processor, a GPU, a graphics processor, a GPGPU, a DPU, a display processor, or any other processing unit that may be configured to perform compute processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, CPUs, application processors, GPUs, graphics processors, DSPs, display processors, image signal processors (ISPs), application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium (e.g., the internal memory 121), and may execute the instructions in hardware using one or more processors to perform the techniques of this disclosure. Any of the foregoing, including hardware, software, a combination of hardware and software, etc., may be considered to be one or more processors.

In some examples, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information (e.g., eye or head position information, rendering commands, or location information) from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

In some examples, the graphical content from the processing unit 120 for display via the display client 131 may not be static and may be changing. Accordingly, the processing unit 120 (and/or the display processor) may periodically refresh the graphical content displayed by the display client 131. For example, the processing unit 120 (and/or the display processor) may periodically retrieve graphical content from the memory 124, where the graphical content may have been updated by the execution of an application (and/or the processing unit 120) that outputs the graphical content to the memory 124.

Referring again to FIG. 1, in some aspects, the processing unit 120 may be configured to operate one or more techniques disclosed herein. For example, the processing unit 120 may include a matrix multiplication handling component 198 configured to execute, e.g., with a load control unit of a streaming processor, a first load instruction to load a set of input data of an input matrix from a first memory to a second memory of the streaming processor, and where the input matrix comprises a first number of rows and a first number of columns.

The example matrix multiplication handling component 198 may also be configured to execute, e.g., with the load control unit, a second load instruction to load a set of weight data of a weight matrix from the first memory to the second memory, and where the weight matrix comprises a second number of rows and a second number of columns.

The example matrix multiplication handling component 198 may also be configured to perform, e.g., with an arithmetic logic unit (ALU) component of the streaming processor, a matrix multiplication operation using the set of input data and the set of weight data to generate an output matrix having the first number of rows and the second number of columns, where each element of the output matrix represents a dot product of a plurality of elements of a row of the set of input data and a column of the set of the weight data. The dot product may include a plurality of multiplication operations and accumulation operations that result in respective intermediate results that are re-input to the ALU component for a subsequent operation of the dot product.

The example matrix multiplication handling component 198 may also be configured to store the output matrix at a general purpose register of the streaming processor, and where the general purpose register is configured to be accessible to the ALU component.

In some examples, the intermediate results are output from the ALU component to an ALU controller, and where the respective intermediate results are re-input from the ALU controller to the ALU component for executing the subsequent operation and includes foregoing accessing of the general purpose register for the executing of the subsequent operation.

The example matrix multiplication handling component 198 may also be configured to execute the first load instruction by loading, with the load control unit, a first block of elements at memory addresses of the first memory using a first pattern, and where the first block of elements correspond to the set of input data of the input matrix. Additionally, the example matrix multiplication handling component 198 may be configured to execute the second load instruction by loading, with the load control unit, a second block of elements at memory addresses of the first memory using a second pattern, and where the second block of elements correspond to the set of weight data of the weight matrix.

The example matrix multiplication handling component 198 may also be configured to use at least one of the first pattern or the second pattern by accessing elements that are at contiguous memory addresses at the second memory.

In some examples, a size of the set of input data of the input matrix is based on a wave size, and a size of the set of weight data of the weight matrix is based on the wave size. In some examples, the wave size corresponds to a plurality of fibers, and each output of the output matrix corresponds to execution of a respective fiber. In some examples, the wave size is a pre-defined configuration.

In some examples, the second memory comprises the general purpose register, and the example matrix multiplication handling component 198 may be configured to execute the first load instruction by loading the set of input data from the first memory to the general purpose register.

In some examples, at least one of the first number of rows and the first number of columns is greater than one, and at least one of the second number of rows and the second number of columns is greater than one.

The example matrix multiplication handling component 198 may also be configured to fetch, with the load control unit, the first load instruction from a local memory or a shared memory accessible to the streaming processor.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a wireless communication device, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, can be performed using other components (e.g., a CPU), consistent with disclosed embodiments.

Figure 2:
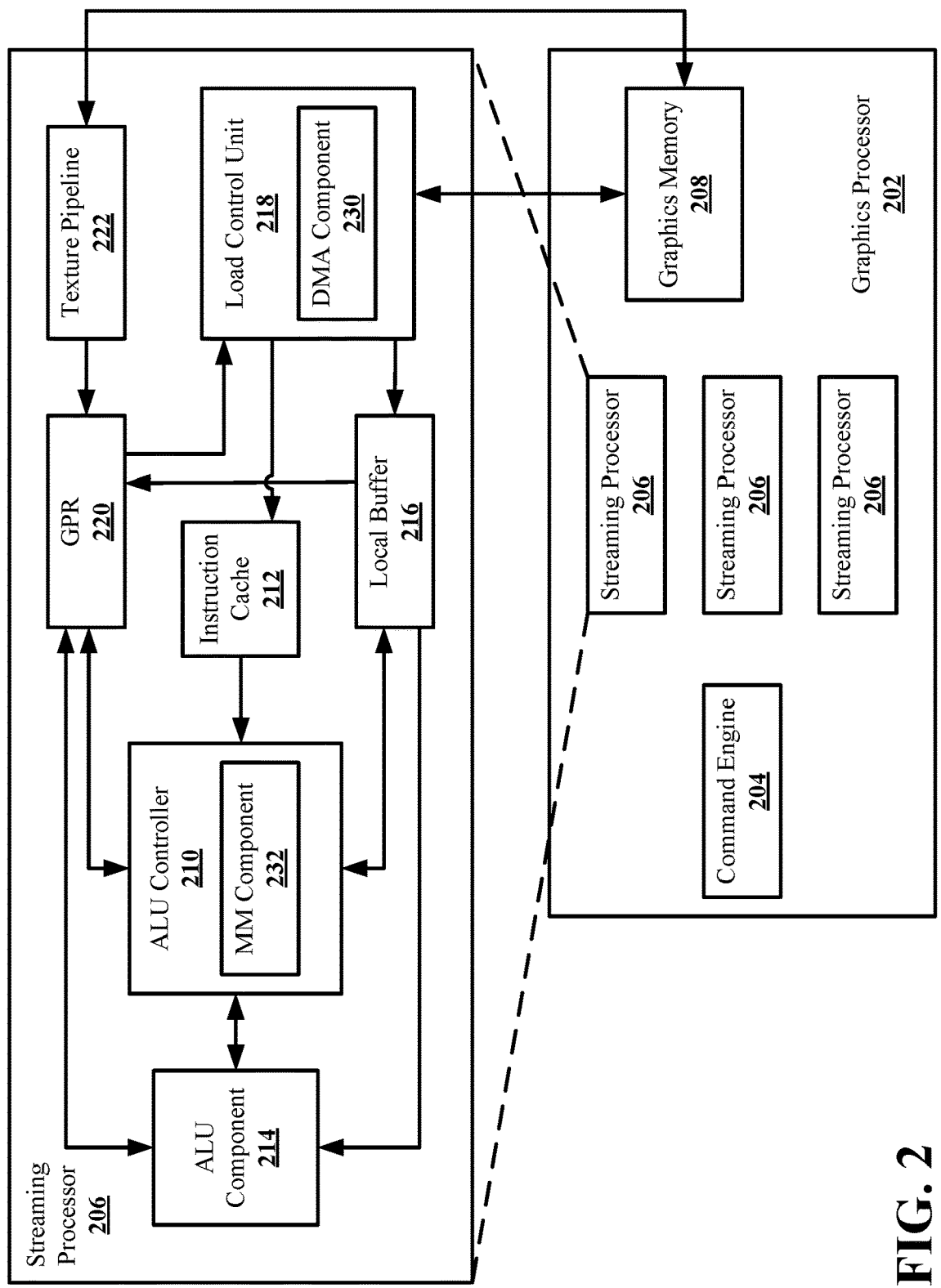
FIG. 2 is a block diagram that illustrates an example graphics processor of an example device of FIG. 1, in accordance with one or more techniques of this disclosure.

FIG. 2 is a block diagram 200 illustrating components of the device 104 of FIG. 1, in accordance with aspects of this disclosure. In particular, the block diagram 200 corresponds to a graphics processor 202. One or more aspects of the graphics processor 202 may be implemented by the processing unit 120 of FIG. 1.

In the illustrated example of FIG. 2, the graphics processor 202 may be configured to execute commands that are issued to the graphics processor 202 by, for example, an application processor (e.g., a CPU). The commands executed by the graphics processor 202 may include general-purpose computing commands, graphics commands, state programming commands, memory transfer commands, etc. In some examples, the graphics processor 202 may be configured to perform graphics operations to render one or more graphics primitives for presentment (e.g., via the display client 131 of FIG. 1). In some such examples, when an application executing on an application processor requests graphics processing, the application processor may provide graphics data to the graphics processor 202 for rendering and issue one or more graphics commands to the graphics processor 202. The graphics data may include vertex buffers, texture data, surface data, etc. In some examples, the application processor may provide the graphics commands and the graphics data to the memory 124, which may be accessed by the graphics processor 202. For example, the application processor may instruct the graphics processor 202 to access the graphics command and/or the graphics data from the memory 124.

In some examples, the graphics processor 202 may be configured to execute general-purpose "shader programs" to facilitate performing computations for applications other than graphics. For example, the graphics processor 202 may be configured to execute compute primitives, such as general matrix multiply (GEMM) operations, convolution operations, pooling operations, batch normalization operations, image processing operations, etc. The graphics processor 202 may then execute the compute primitives and provide the result(s) to the application (and/or the application processor) for further processing.

The example graphics processor 202 of FIG. 2 includes a command engine 204, one or more streaming processor(s) 206, and a graphics memory 208. In some examples, the command engine 204 and the one or more streaming processors 206 may be configured to implement aspects of the example graphics processing pipeline 107 of FIG. 1. In some examples, the graphics processor 202 may be configured to execute instructions that cause the graphics processor 202 (and/or the one or more streaming processors 206) to perform one or more of the example techniques disclosed herein.

In the illustrated example, the command engine 204 may receive commands and configure the streaming processors 206 to perform various operations for carrying out the commands. In the illustrated example, the graphics processor 202 includes three example streaming processors 206 (sometimes referred to as "shader processors" or "shader cores"), each of which may be a programmable streaming processor or a fixed-function streaming processor. A programmable streaming processor may include, for example, a programmable shader unit that is configured to execute one or more shader programs that are downloaded onto the graphics processor 202 (e.g., from an application processor and/or the memory 124). In some examples, a shader program may be a compiled version of a program written in a shading language. In some examples, the programmable shader units may include compute shader units.

A fixed-function streaming processor may include hardware that is hard-wired to perform certain functions. In some examples, the fixed-function streaming processor may additionally or alternatively include freely programmable shader-controlled pipelines that may enable the fixed-function streaming processor to perform some configurable functions. Although the fixed-function streaming processor may be configurable to perform different functions (e.g., via one or more control signals), the fixed-function hardware may not include a program memory that is capable of receiving user-compiled programs (e.g., from a graphics driver).

Although the following description is directed to a graphics processor that performs compute (or machine learning) tasks (e.g., matrix multiplication), it may be appreciated that the graphics processor 202 may be selectively driven to perform a graphics processing task, a GPGPU task, or any other type of task suitable for a graphics processor based on the software loaded to run on the graphics processor as well as the driver used to control operation of the graphics processor. Thus, while the commands received by the command engine 204 may include one or more compute commands, one or more machine learning commands, one or more graphics commands, one or more state commands, one or more memory transfer commands, the disclosed commands are directed to compute commands that may be used by the graphics processor 202 to perform one or more compute primitives issued by, for example, the processing unit 120.

In the illustrated example of FIG. 2, the graphics processor 202 includes a graphics memory 208 that is directly coupled to the graphics processor 202 so that the graphics processor 202 may read data from and/or write data to the graphics memory 208 without using a bus to access the memory 124. Thus, the graphics processor 202 may process data locally using a local storage (e.g., the graphics memory 208) without using an off-chip memory (e.g., the memory 124). For example, the graphics memory 208 may be an on-chip memory that is on-chip with the graphics processor 202 and in relatively close proximity with components of the graphics processor 202, and may be associated with a dedicated memory bus within the graphics processor 202. In contrast, to access data stored in the memory 124, the graphics processor 202 may share a memory bus with other components of the processing unit 120 (e.g., an application processor, a display processor, etc.), which may result in a more limited available bandwidth. Aspects of the graphics memory 208 may be implemented by the internal memory 121 of FIG. 1.

In general, the graphics memory 208 may include one or more caches that are fast memories that can store data and/or instructions accessible to the streaming processors 206. In some examples, the graphics memory 208 may be an intermediate memory between a global or system memory (e.g., the memory 124) and the streaming processors 206. In some examples, the graphics memory 208 may be populated with instructions and/or data from the memory 124 that is associated with a workgroup (or kernel).

In the illustrated example of FIG. 2, the streaming processors 206 include an ALU controller 210, an instruction cache 212, an ALU component 214, a local buffer 216, a load control unit 218, a general purpose register (GPR) 220, and a texture pipeline 222. The example ALU controller 210, the example instruction cache 212, the example ALU component 214, the example local buffer 216, the example load control unit 218, the example GPR 220, and/or the example texture pipeline 222 may be in communication via a communication interface, such as a bus. In some examples, the bus may be implemented using any combination of bus structures and/or bus protocols.

In the illustrated example, the ALU controller 210 is configured to control execution of the ALU component 214 by, for example, instructing the ALU component 214 which function (e.g., arithmetic function) to perform. For example, the ALU controller 210 may facilitate scheduling and managing execution of instructions of a fiber by the ALU component 214. For example, the ALU controller 210 may be configured to fetch instructions from the instruction cache 212, decode each instruction (if necessary), fetch operand(s) (if necessary) for executing the instruction, and perform flow control for the ALU component 214.

In the illustrated example of FIG. 2, the instruction cache 212 stores instructions for the fibers. These instructions indicate specific operations to be performed for each fiber. Each operation may be an arithmetic operation, a memory access operation, etc. The instruction cache 212 may be loaded with instructions from the graphics memory 208 and/or the memory 124, as needed, via the load control unit 218.

In the illustrated example of FIG. 2, the ALU component 214 may perform arithmetic operations (e.g., addition, subtraction, multiplication, division, etc.), logic operations (e.g., logic AND operations, logic OR operations, logic XOR operations, etc.), comparison operations (e.g., greater than operations function, less than operations, equal to zero operations, etc.), etc. The ALU component 214 may perform (or execute) an operation based on an instruction received from the ALU controller 210. The instruction may include an operation identifier identifying an operation to perform, operand(s) for executing the operation, and a destination for storing the output of executing the operation. For example, the ALU controller 210 may instruct the ALU component 214 to perform a multiply function providing the ALU component 214 an instruction including a "MUL" identifier, a first operand (op1), a second operand (op2), and a destination (e.g., the GPR 220) for storing the output of performing the multiply operation (e.g., the result of op1*op2).

Although shown as a single component in the illustrated example, it may be appreciated that the ALU component 214 may include a combination of scalar ALUs and/or vector ALUs. A scalar ALU may be configured to operate on one component (or attribute) at a time. A vector ALU may be configured to operate on multiple components at a time. For example, a scalar ALU may operate on one component of a pixel at a time, while a vector ALU may operate on multiple components (e.g., all of the components) of a pixel at a time. It may be appreciated that the scalar ALU may consume fewer resources than the vector ALU during operation.

In the illustrated example of FIG. 2, the local buffer 216 is a memory that is accessible by the ALU controller 210 and the ALU component 214. In the illustrated example, the local buffer 216 is configured to store data that is accessible to different ALUs of the ALU component 214 executing the fibers in a wave. For example, the local buffer 216 may store constant data used by the ALU component 214 during execution of the different fibers in a wave.

In the illustrated example of FIG. 2, the load control unit 218 (sometimes referred to as a "load store unit") is configured to control the loading of instructions and/or data to and from the streaming processor 206. For example, the load control unit 218 may interface with the graphics memory 208 and load instructions to the instruction cache 212 of the streaming processor 206. The load control unit 218 may also interface with the graphics memory 208 and load data from the graphics memory 208 to the memories (e.g., the local buffer 216 and the GPR 220) of the streaming processor 206. The load control unit 218 may also write data to the graphics memory 208. For example, the load control unit 218 may fetch, from the GPR 220, output data generated by the ALU component 214 and store the fetched output data at the graphics memory 208.

In the illustrated example of FIG. 2, the GPR 220 is a memory that is accessible to the ALU component 214. The GPR 220 may store output data generated by the ALU component 214 (e.g., an ALU of the ALU component 214) and may additionally or alternatively store input data that is provided to the ALU component 214 for processing (e.g., an operand for performing arithmetic functions).

In the illustrated example, the GPR 220 is configured to store data that is accessible to the ALU component 214 executing a fiber. For example, the GPR 220 may store data input data used by the ALU component 214 to execute a fiber, may store intermediate results generated by the ALU component 214 during execution of a fiber, and/or may store output data generated by the execution of the fiber.

In some examples, the GPR 220 may include scalar registers for storing one element at a time. The GPR 220 may additionally or alternatively include vector registers for storing multiple elements at a time. It may be appreciated that the scalar register may consume fewer resources than the vector register during operation. Furthermore, in some examples, the ALU controller 210 may be configured to fetch operand(s) from scalar registers when instructing a scalar ALU of the ALU component 214 to perform an operation. Similarly, the ALU controller 210 may be configured to fetch operand(s) from vector registers when instructing a vector ALU of the ALU component 214 to perform an operation.

In the illustrated example, the texture pipeline 222 is configured to perform graphics operations, such as texture mapping. Texture mapping may include modifying the color of a pixel with a color of a texture. The texture pipeline 222 may access data from the graphics memory 208. In some examples, the texture pipeline 222 may include an address generator configured to compute the position of a pixel (e.g., based on a reference position and one or more offsets), a texture cache configured to store pixel information (e.g., from the graphics memory 208) for a pixel based on the position of the pixel provided by the address generator, and a texture operating component configured to perform one or more operations on the pixel information. Output from the texture pipeline may be stored at the GPR 220.

Figure 4:
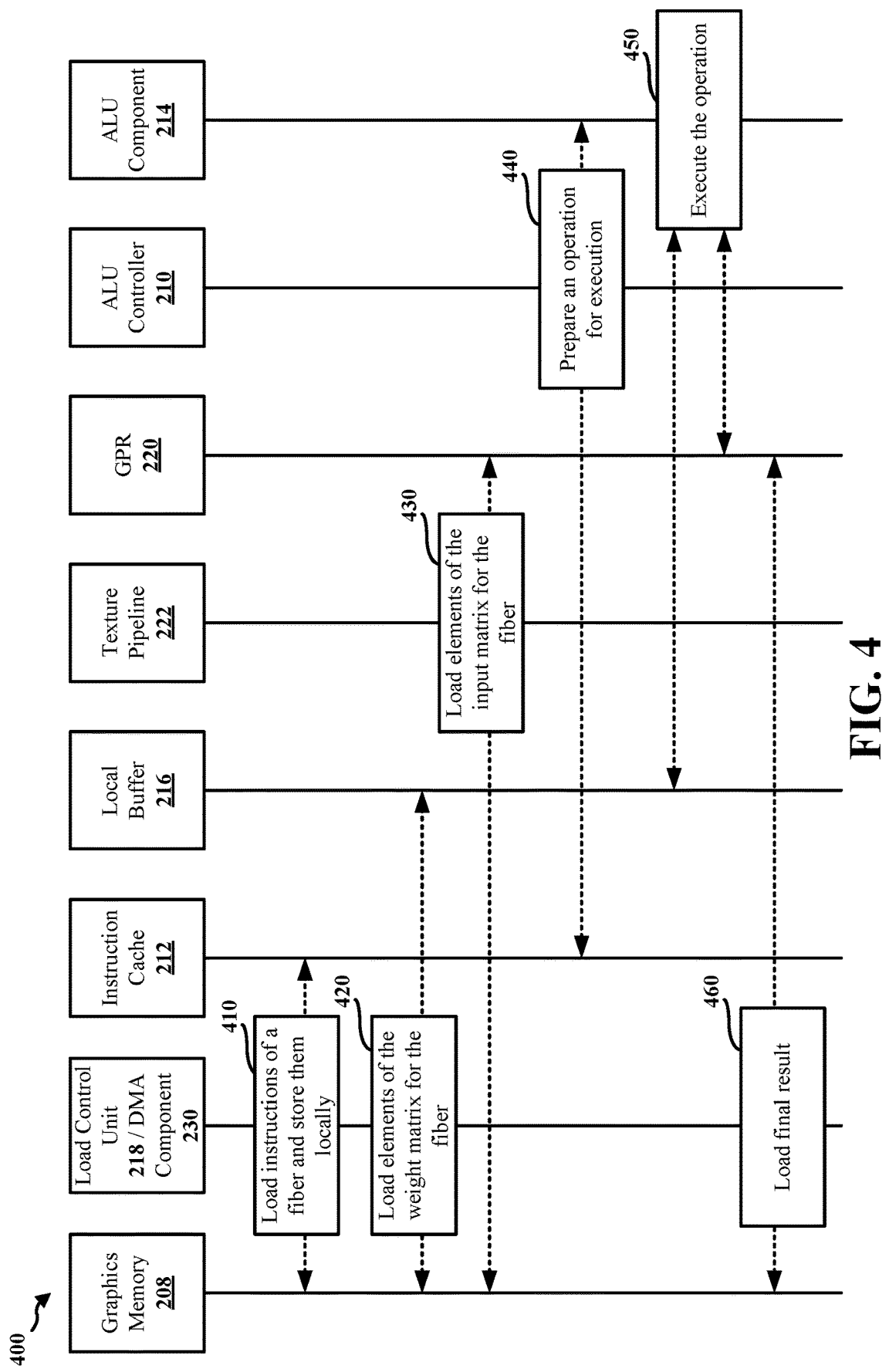
FIG. 4 is an example communication flow at a streaming processor, in accordance with the teachings disclosed herein.

As described above, the streaming processor 206 may be configured to perform compute primitives, such as matrix multiplication. FIG. 3 is a block diagram 300 illustrating performing matrix multiplication. To perform matrix multiplication, each element of an output matrix is calculated as a "dot product" (e.g., a sum of the products of elements of a corresponding row of a first matrix and elements of a corresponding column of a second matrix). In the illustrated example of FIG. 3, a first matrix 302 and a second matrix 304 are provided. As shown in FIG. 4, the first matrix 302 (sometimes referred to as an "input matrix" or an "input activation matrix") is a 4×4 matrix and includes a first number of rows Rows_a (e.g., 4 rows) and a first number of columns Columns_a (e.g., 4 columns). The second matrix 304 (sometimes referred to as a "weight matrix" or a "constant matrix") is a 4×4 matrix and includes a second number of rows Rows_b (e.g., 4 rows) and a second number of columns Columns_b (e.g., 4 columns).

In the illustrated example of FIG. 3, the elements of the input matrix 302 are each designated by two letters, with the first letter indicating the row containing the element and the second letter indicating the column containing the element. Thus, for example, element "AB" of the input matrix 302 is located at row A and column B of the input matrix 302. Similarly, the elements of the weight matrix 304 are designated with two numbers, with the first number indicating the row containing the element and the second number indicating the column containing the element. Thus, for example, element "23" of the weight matrix 304 is located at row 2 and column 3 of the weight matrix 304.

An output matrix 306 represents the result of performing a matrix multiplication operation on the matrices 302, 304. As shown in FIG. 3, the elements of the output matrix 306 indicate the computations used to generate the respective element of the output matrix 306. For example, an upper-left element 306a of the output matrix 306 is computed by summing the products of elements of row A of the input matrix 302 with elements of column 1 of the weight matrix 304. Accordingly, the value of the upper-left element 306a is the sum of the products of element "AA" of the input matrix 302 and element "00" of the weight matrix 304, element "AB" of the input matrix 302 and element "10" of the weight matrix 304, element "AC" of the input matrix 302 and element "20" of the weight matrix 304, and element "AD" of the input matrix 302 and element "30" of the weight matrix 304. Corresponding computations are made for each of the other elements of the output matrix 306. The resulting output matrix 306 has dimensions Rows_a (e.g., the number of rows of the input matrix 302) by Columns_b (e.g., the number of columns of the weight matrix 304). As shown in FIG. 3, the output matrix 306 is a 4×4 matrix corresponding to the four rows of the input matrix 302 and the four columns of the weight matrix 304.

In the illustrated example of FIG. 3, each element of the output matrix 306, such as the upper-left element 306a, represents an output of executing a fiber (or thread), each row of the output matrix 306, such as a row 306b, represents a wave (or warp), and the entire output matrix 306 represents a workload (or a kernel). Thus, it may be appreciated that executing a fiber may include performing a number of operations, such as multiplication operations, addition operations, and/or multiply-addition operations (sometimes referred to as "multiply-accumulate" operations).

While the example matrix multiplication of FIG. 3 includes operating on two 4×4 matrices 302, 304, in other examples, each matrix may have any number of rows and/or columns, such as several hundreds, several thousands, etc. Furthermore, when performing the matrix multiplication, it may be appreciated that the resources available at the streaming processor 206 may be limited. For example, the GPR 220 and/or the local buffer 216 may be relatively small compared to the size of the graphics memory 208 and the memory 124 of FIG. 1. Accordingly, when performing the matrix multiplication, elements of the input matrix 302 and elements of the weight matrix 304 may be split into slices (or chunks) that fit into a compute workgroup. The size of the compute workgroup may be based on the size of the GPR 220 and the size of the local buffer 216.

FIG. 4 is an example communication flow 400 between components of a processing unit, as described herein. In the illustrated example, the communication flow 400 facilitates performing the matrix multiplication of FIG. 3. Aspects of the communication flow 400 may be implemented by the graphics processor 202 of FIG. 2.

At 410, the load control unit 218 may load instructions of a fiber and store them locally. For example, the load control unit 218 may be configured to fetch instructions of a fiber from the graphics memory 208 and store the instructions in the instruction cache 212.

At 420, the load control unit 218 may load elements of a weight matrix for the fiber. For example, the load control unit 218 may load elements of the weight matrix 304 associated with the fiber from the graphics memory 208 to the local buffer 216.

At 430, the texture pipeline 222 may load elements of an input matrix for the fiber. For example, the texture pipeline 222 may be configured to load elements of the input matrix 302 associated with the fiber from the graphics memory 208 to the GPR 220. As described above, the texture pipeline 222 may perform different functions when loading an element from the graphics processor 202 to the GPR 220. For example, the texture pipeline 222 may determine an address for an element, may fetch the component(s) associated with the element, and may perform one or more operations on the element before storing the element at the GPR 220. Accordingly, the loading of an element via the texture pipeline 222 may be a relatively long process compared to loading an element via the load control unit 218.

At 440, the ALU controller 210 may prepare an operation for execution by the ALU component 214. For example, the ALU controller 210 may fetch an instruction from the instruction cache 212, decode the instruction to determine which operation to perform and which operand(s) to retrieve for executing the operation associated with the instruction, and provide the decoded instruction to the ALU component 214 for executing.

At 450, the ALU component 214 may execute the operation associated with the decoded instruction and store the output at the GPR 220.

At 460, and when the instructions associated with the fiber are complete (e.g., when a final result is calculated), the load control unit 218 may load the final result of the fiber. For example, the load control unit 218 may be configured to fetch the final result from the GPR 220 and store the final result at the graphics memory 208.

As described above, performing a matrix multiplication operation includes performing a dot product, which includes executing multiplication operations and executing addition operations. In some examples, the performing of the dot product may include executing multiplication operations and multiply-addition operations. The ALU controller 210 fetches an instruction from the instruction cache 212, decodes the instruction and instructs the ALU component 214 which operation to perform (e.g., a multiplication operation, an addition operation, a multiply-addition operation, etc.) based on the operation identifier included in the instruction. The ALU controller 210 may also fetch the operands from the GPR 220 and the local buffer 216 for executing the respective operation.

For example, the ALU controller 210 may instruct the ALU component 214 to execute a multiplication instruction by providing the ALU component 214 a MUL identifier corresponding to a multiplication operation, a first operand (op1) (or a location for accessing the first operand), and a second operand (op2) (or a location for accessing the second operand). The ALU component 214 may fetch the first operand (op1) (e.g., an element of the input matrix 302) from the GPR 220 and may fetch the second operand (op2) (e.g., an element of the weight matrix 304) from the local buffer 216. The ALU component 214 may perform the multiplication operation and store the output (e.g., the result of op1*op2) at the GPR 220. It may be appreciated that the output of the multiplication operation is an intermediate result as the output is used in an addition operation or a multiply-addition operation when performing the dot product. For example, the output of the multiplication operation may comprise a first portion of the upper-left element 306a (e.g., the product of element "AA" of the input matrix 302 and element "00" of the weight matrix 304).

Similarly, the ALU controller 210 may instruct the ALU component 214 to execute a multiply-addition instruction by providing the ALU component 214 a MAD identifier corresponding to a multiply-addition operation, a first operand (op1) (or a location for accessing the first operand), a second operand (op2) (or a location for accessing the second operand), and a third operand (op3) (or a location for accessing the third operand). The ALU controller 210 may fetch the first operand (op1) (e.g., an element of the input matrix 302) from the GPR 220, may fetch the second operand (op2) (e.g., an element of the weight matrix 304) from the local buffer 216, and may fetch the third operand (op3) (e.g., an intermediate result, such as the first portion of the upper-left element 306a) from the GPR 220. The ALU component 214 may perform the multiply-addition operation and store the output (e.g., the result of op1*op2+op3) at the GPR 220. It may be appreciated that in some examples, based on the sizes of the input matrix 302 and the weight matrix 304, the ALU controller 210 and the ALU component 214 may perform any number of multiply-addition operations, such as several hundreds of multiply-addition operations, several thousands of multiply-addition operations, etc.

Thus, it may be appreciated that performing matrix multiplication is computationally expensive. Because of the prevalence of matrix multiplication operations in machine learning applications and artificial intelligence applications, improving the efficiency of performing matrix multiplication operations may be beneficial.

For example, in the above example, to accelerate memory access, some examples fetch elements of the input matrix via the texture pipeline 222 and fetch elements of the weight matrix via the load control unit 218. While accessing the elements via the texture pipeline 222, the load control unit 218 may utilize parallel memory access, accessing elements via the texture pipeline 222, which may be associated with a relatively longer data fetch latency as elements are processed by components of the texture pipeline 222 prior to storage at the GPR 220. Furthermore, accessing the elements via the texture pipeline 222 may incur a processing cost of performing the respective texture pipeline-related functions. Additionally, since elements are loaded via two different paths (e.g., via the texture pipeline 222 and the load control unit 218), a processing cost may be associated with synchronizing the fetched data (e.g., synchronizing the element fetched via the texture pipeline 222 corresponds to the element fetched via the load control unit 218 for the same instruction). Thus, the streaming processor 206 may incur long memory latency and low bandwidth utilization penalties for accessing the elements via the texture pipeline 222 and the load control unit 218.

Furthermore, in some examples, because of the granular execution of an instruction, elements fetched for an instruction may be stored in the respective memory in a scattered manner. For example, a first element may be stored at memory address with a value of 0, a second element may be stored at memory address with a value of 400, a third element may be stored at memory address with a value of 16, etc. Accordingly, the ALU controller 210 and the ALU component 214 may perform address calculations to calculate the memory address of a respective element. However, performing the address calculation may include storing offsets for respective memory addresses at the GPR 220. Thus, the number of elements that may be stored at the GPR 220 is reduced, for example, as, for each element, an offset is also stored for accessing the respective element.

In some examples, there may be a penalty incurred for memory access as the execution of a fiber may cause the ALU controller 210 to fetch multiple intermediate results from the GPR 220 and for the ALU component 214 to store the intermediate results at the GPR 220. For example, as described above, in some examples, each time the ALU component 214 performs an operation, the ALU component 214 may store the output at the GPR 220, and if the output is an intermediate result, the ALU controller 210 may be configured to fetch the intermediate result from the GPR 220 to provide to the ALU component 214 as an operand for a subsequent operation.

Moreover, in some examples, an element of the input matrix 302 that is loaded to the GPR 220 may be used during the execution of multiple fibers and/or instructions. However, as described above, the elements of the input matrix are fetched for each instruction and, thus, there is an input data fetching penalty that may be incurred in some examples.

In view of the above inefficiencies, example techniques disclosed herein for performing matrix multiplication may result in a low level of ALU component utilization and a high degree of processing power waste.

Examples techniques disclosed herein facilitate improving the efficiency of performing matrix multiplication. Furthermore, disclosed techniques utilize components of the streaming processor 206 without needing additional hardware. Example techniques facilitate improving memory access latencies associated with loading elements from the graphics processor 202, improving memory access costs associated with loading intermediate results from the GPR 220, increasing storage space available at the GPR 220, and reducing input data fetching penalties incurred by fetching redundant elements.

Referring again to FIG. 2, the streaming processor 206 includes an example direct memory access (DMA) component 230 and an example matrix multiplication (MM) component 232. Although the example DMA component 230 is illustrated as a component of the load control unit 218, it may be appreciated that aspects of the DMA component 230 may be implemented by the load control unit 218. Similarly, aspects of the MM component 232 may be implemented by the ALU controller 210.

In the illustrated example of FIG. 2, the DMA component 230 is configured to facilitate improving memory access latencies between the streaming processor 206 and the graphics memory 208. For example, the DMA component 230 may be configured to enable fetching elements of the input matrix 302 and elements of the weight matrix 304 via the load control unit 218. When instructed, the DMA component 230 may load elements of the weight matrix 304 from the graphics memory 208 to the local buffer 216. Similarly, the DMA component 230 may be configured to load elements of the input matrix 302 from the graphics memory 208. In this manner, the DMA component 230 enables bypassing the loading of elements of the input matrix 302 via the texture pipeline 222. By avoiding loading elements via the texture pipeline 222, the example DMA component 230 enables reducing the power resource penalty and the processing resource penalty associated with using the texture pipeline 222 to load the elements. As described above, loading elements via the texture pipeline 222 incurs a penalty associated with a relatively longer processing pipeline between accessing the element at the graphics memory 208 and storing the element at the GPR 220 compared to loading the element from the graphics memory 208 via the load control unit 218. That is, the memory access pipeline associated with the load control unit 218 is relatively shorter than the memory access pipeline associated with the texture pipeline 222 and, thus, loading elements of the input matrix 302 and loading elements of the weight matrix 304 via the DMA component 230 facilitates improving memory access latency and facilitates reducing processing and power consumption costs incurred by using the texture pipeline 222.

In some examples, when the DMA component 230 fetches an element of the input matrix 302 from the graphics memory 208, the DMA component 230 may determine whether the element is shared by multiple fibers. For example, some operations, such as convolution operations, may include using one or more elements across fibers. If the DMA component 230 determines that the fetched element is a shared element, then the DMA component 230 may store the fetched element at the local buffer 216. The local buffer 216 may then broadcast the respective element to the GPR 220 when a corresponding fiber is being executed. By storing the element at the local buffer 216, the DMA component 230 facilitates reducing data input fetching latencies associated with performing redundant fetches for a same element across fibers. In some examples, the elements stored at the local buffer 216 may remain in the local buffer 216 until the workgroup associated with the fiber is completed. Thus, in some examples, an element that is shared across fibers may remain in the local buffer 216 until the corresponding workgroup is executed (e.g., the output matrix 306 is populated).

In some examples, if the DMA component 230 determines that the fetched element is not a shared element, then the DMA component 230 may store the fetched element at the GPR 220. By storing the fetched element at the GPR 220, the DMA component 230 facilitates bypassing the storing of the fetched element at the local buffer 216 and the redundant reading and writing of the element from the local buffer 216.

The example DMA component 230 also facilitates executing a "block" load instruction (e.g., "load.blk") to load a "block" of elements from the graphics memory 208. In some examples, the block load instruction is a single fiber instruction to load a "block" of data from the graphics memory 208 instead of performing multiple load instructions per fiber. For example, if executing a fiber is associated with a number of load instructions (e.g., 40 load instructions), then, instead of performing the 40 load instructions one-at-a-time (e.g., perform a first load instruction, perform the corresponding operation, perform a second load instruction, etc.), the DMA component 230 facilitates loading the elements associated with the 40 load instructions via execution of one instruction (e.g., the block load instruction).

In some examples, when calling the block load instruction, the DMA component 230 may be configured to include dimensions of the "block" of elements and offsets for accessing the respective elements. Accordingly, the DMA component 230 may perform the address calculation for accessing the elements and, thus, enable avoiding the ALU controller 210 and/or the ALU component 214 performing the address calculation. Furthermore, by enabling the DMA component 230 to perform the address calculation, it may be appreciated that the offsets may no longer be stored at the GPR 220, which may enable increasing the amount of the GPR 220 that may be used for storing elements of the input matrix 302.

In some examples, the DMA component 230 may store the fetched elements in a pattern based on the performing of the matrix multiplication. For example, the calculation of each element of the output matrix 306 follows a pattern where the elements of a row of the input matrix 302 are traversed column-by-column and the elements of a column of the weight matrix 304 are traversed row-by-row. Accordingly, the DMA component 230 is configured to store the fetched elements in a pattern so that scattered memory accesses for the elements is not performed. In some examples, the pattern may include storing the fetched elements in a contiguous block so that the DMA component 230 stores a first element, for example, at memory address 0, stores a second element at memory address 1, stores a third element at memory address 2, etc.

In some examples, the dimensions of the block defined by the block load instruction may correspond to the size of the wave. For example, if a wave includes 64 fibers, then executing the block load instruction may facilitate fetching the data associated with the 64 fibers in one instruction instead of, for example, executing load instructions for the 64 fibers one-at-a-time. Furthermore, the data corresponding to the 64 fibers is loaded contiguous rather than scattered. Because the data is patterned (e.g., contiguous), performing address calculations by the ALU controller 210 and/or the ALU component 214 may be avoided.

In some examples, the DMA component 230 may be configured to execute one block load instruction to load a block (or set) of elements of the input matrix 302. The example DMA component 230 may also be configured to execute one block load instruction to load a block (or set) of elements of the weight matrix 304. Thus, by executing a first block load instruction (e.g., to load a block of elements of the input matrix 302) and a second block load instruction (e.g., to load a block of elements of the weight matrix 304), the DMA component 230 may reduce the number of load instructions to the graphics memory 208. For example, the DMA component 230 may load the elements for a wave of fibers by executing two block load instructions instead of executing load instructions for each fiber of the wave.

To facilitate improving performance of matrix multiplication during execution of a fiber, the example ALU controller 210 includes the MM component 232. The example MM component 232 is configured to manage access of intermediate results calculated during execution of a fiber. For example, as described above, each time the ALU component 214 performs an operation, the ALU component 214 may store the output at the GPR 220. Accordingly, in some such examples, the ALU controller 210 may incur memory access penalties for accessing the intermediate result from the GPR 220 for a subsequent operation. The example MM component 232 may be configured to cause the ALU component 214 to store outputs (e.g., the intermediate results) at the MM component 232, for example, by modifying the destination for storing the output of executing the operation. Thus, during execution of an instruction, the ALU controller 210 may fetch the respective operand (e.g., the intermediate result or the third operand (op3) in a multiply-addition operation) from the MM component 232 and avoid accessing the operand (e.g., the intermediate result) from the GPR 220. For example, the MM component 232 may be configured to enable reusing the intermediate result for a subsequent operation (e.g., an accumulation operation, a multiply-addition operation, etc.) without the ALU controller 210 accessing the GPR 220. The MM component 232 may also be configured to cause the final result to be stored in the GPR 220, which may then be fetched by the load control unit 218 to store at the graphics memory 208.

In some examples, by storing the intermediate results at the MM component 232 (e.g., not at the GPR 220), the example MM component 232 enables reducing the memory access penalty associated with accessing the operand at the GPR 220. Accordingly, the ALU controller 210 is able to more efficiently provide instructions to the ALU component 214 for execution. In some examples, the ALU controller 210 may be configured to provide the instructions to scalar ALUs of the ALU component 214, thereby reducing power consumption by the ALU component 214 during operation and reducing the processing load of the ALU component 214. Thus, it may be appreciated that the storing of the intermediate results for a fiber at the MM component 232 may enable increasing utilization of the ALU component 214 by reducing wait times associated with accessing the intermediate results from the GPR 220.

Figure 5:
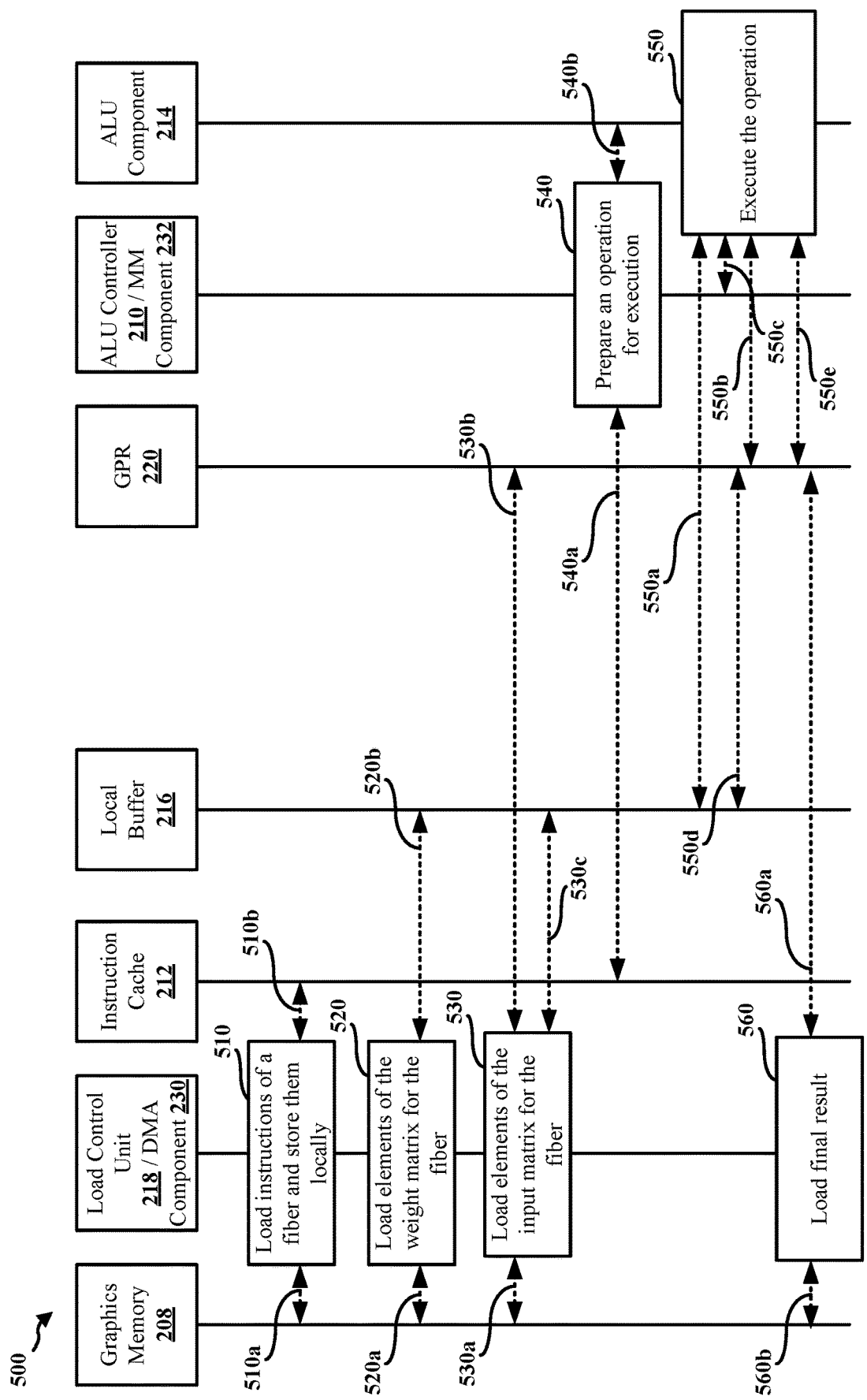
FIG. 5 is an example communication flow at a streaming processor, in accordance with the teachings disclosed herein.

FIG. 5 is an example communication flow 500 between components of a processing unit, as described herein. In the illustrated example, the communication flow 500 facilitates performing the matrix multiplication of FIG. 3. Aspects of the communication flow 500 may be implemented by the graphics processor 202 of FIG. 2.

At 510, the load control unit 218 may load instructions of a fiber and store them locally. For example, the load control unit 218 may be configured to fetch instructions of a fiber from the graphics memory 208 (e.g., at 510a) and store the instructions in the instruction cache 212 (e.g., at 510b).

At 520, the DMA component 230 may load elements of a weight matrix for the fiber. For example, the DMA component 230 may fetch elements of the weight matrix 304 associated with the fiber from the graphics memory 208 (e.g., at 520a) and the store the fetched elements of the weight matrix 304 at the local buffer 216 (e.g., at 520b). The DMA component 230 may execute a "block" load instruction (e.g., "load.blk") to load a "block" of elements of the weight matrix 304 for the fiber at the local buffer 216.

At 530, the DMA component 230 may load elements of an input matrix for the fiber. For example, the DMA component 230 may fetch elements of the input matrix 302 associated with the fiber from the graphics memory 208 (e.g., at 530a) and the store the fetched elements of the input matrix 302 at the GPR 220 (e.g., at 530b). In this manner, the DMA component 230 enables bypassing the loading of elements of the input matrix 302 via the texture pipeline 222 (as shown at 430 of FIG. 4). The DMA component 230 may execute a "block" load instruction (e.g., "load.blk") to load a "block" of elements of the input matrix 302 for the fiber at the GPR 220.

In some examples, when the DMA component 230 fetches an element of the input matrix 302 from the graphics memory 208 (e.g., at 530a), the DMA component 230 may determine whether the element is shared by multiple fibers. If the DMA component 230 determines that the fetched element is not a shared element, then the DMA component 230 may store the fetched element at the GPR 220 (e.g., at 530b). By storing the fetched element at the GPR 220, the DMA component 230 facilitates bypassing the storing of the fetched element at the local buffer 216 and the redundant reading and writing of the element from the local buffer 216.

If the DMA component 230 determines that the fetched element is a shared element, then the DMA component 230 may store the fetched element at the local buffer 216 (e.g., at 530c). The local buffer 216 may then broadcast the respective element to the GPR 220 when a corresponding fiber is being executed (e.g., at 550d). By storing the element at the local buffer 216, the DMA component 230 facilitates reducing data input fetching latencies associated with performing redundant fetches for a same element across fibers. In some examples, the elements stored at the local buffer 216 may remain in the local buffer 216 until the workgroup associated with the fiber is completed. Thus, in some examples, an element that is shared across fibers may remain in the local buffer 216 until the corresponding workgroup is executed (e.g., the output matrix 306 is populated).

In some examples, when calling the block load instruction (e.g., at 520 and/or 530), the DMA component 230 may be configured to include dimensions of the "block" of elements and offsets for accessing the respective elements. Accordingly, the DMA component 230 may perform the address calculation for accessing the elements.

The DMA component 230 may store the fetched elements (e.g., at 520b, 530b, and/or 530c) in a pattern based on the performing of the matrix multiplication. For example, the DMA component 230 may be configured to store the fetched elements in a pattern so that scattered memory accesses for the elements is not performed. In some examples, the pattern may include storing the fetched elements in a contiguous block so that the DMA component 230 stores a first element, for example, at memory address 0, stores a second element at memory address 1, stores a third element at memory address 2, etc.

At 540, the ALU controller 210 may prepare an operation for execution by the ALU component 214. For example, the ALU controller 210 may be configured to fetch an instruction from the instruction cache 212 (e.g., at 540a), decode the instruction to determine which operation to perform and which operand(s) to retrieve for executing the operation associated with the instruction, and provide the decoded instruction to the ALU component 214 for executing (e.g., at 540b).

In some examples, the ALU controller 210 determines whether the execution of the fiber includes another operation to perform. When the ALU controller 210 determines that there is another execution of the fiber includes performing another operation, the ALU controller 210 may prepare another operation for execution by the ALU component 214. Otherwise, when the ALU controller 210 determines that execution of the fiber is complete, the ALU controller 210 may indicate to the ALU component 214 that there is not another operation to perform.

At 550, the ALU component 214 may execute the operation associated with the decoded instruction and store the output at the GPR 220. For example, the ALU component 214 may be configured to fetch elements of the weight matrix 304 from the local buffer 216 (e.g., at 550*a*), and may be configured to fetch elements of the input matrix 302 from the GPR 220 (e.g., at 550*b*).

To facilitate improving performance of matrix multiplication during execution of a fiber, the example MM component 232 of the ALU controller 210 is configured to manage access of intermediate results calculated during execution of a fiber. The example MM component 232 may be configured to cause the ALU component 214 to store outputs (e.g., the intermediate results) at the MM component 232 (e.g., at 550*c*), for example, by modifying the destination for storing the output of executing the operation. Thus, during execution of an instruction, the ALU controller 210 may fetch the respective operand (e.g., the intermediate result or the third operand (op3) in a multiply-addition operation) from the MM component 232 and avoid accessing the operand (e.g., the intermediate result) from the GPR 220. For example, the MM component 232 may be configured to enable reusing the intermediate result for a subsequent operation (e.g., an accumulation operation, a multiply-addition operation, etc.) without the ALU controller 210 accessing the GPR 220. The MM component 232 may also be configured to cause the final result to be stored in the GPR 220, which may then be fetched by the load control unit 218 to store at the graphics memory 208.

In some examples, based on an indication that there are no more operations to perform (e.g., from the ALU controller 210, the ALU component 214 may store the final result of the fiber at the GPR 220 (e.g., at 550*e*). In this manner, the ALU component 214 may avoid storing intermediate results at the GPR 220 and store the final result.

At 560, and when the instructions associated with the fiber are complete (e.g., when a final result is calculated), the load control unit 218 may load the final result of the fiber. For example, the load control unit 218 may be configured to fetch the final result from the GPR 220 (e.g., at 560*a*) and store the final result at the graphics memory 208 (e.g., at 560*b*).

Figure 6:
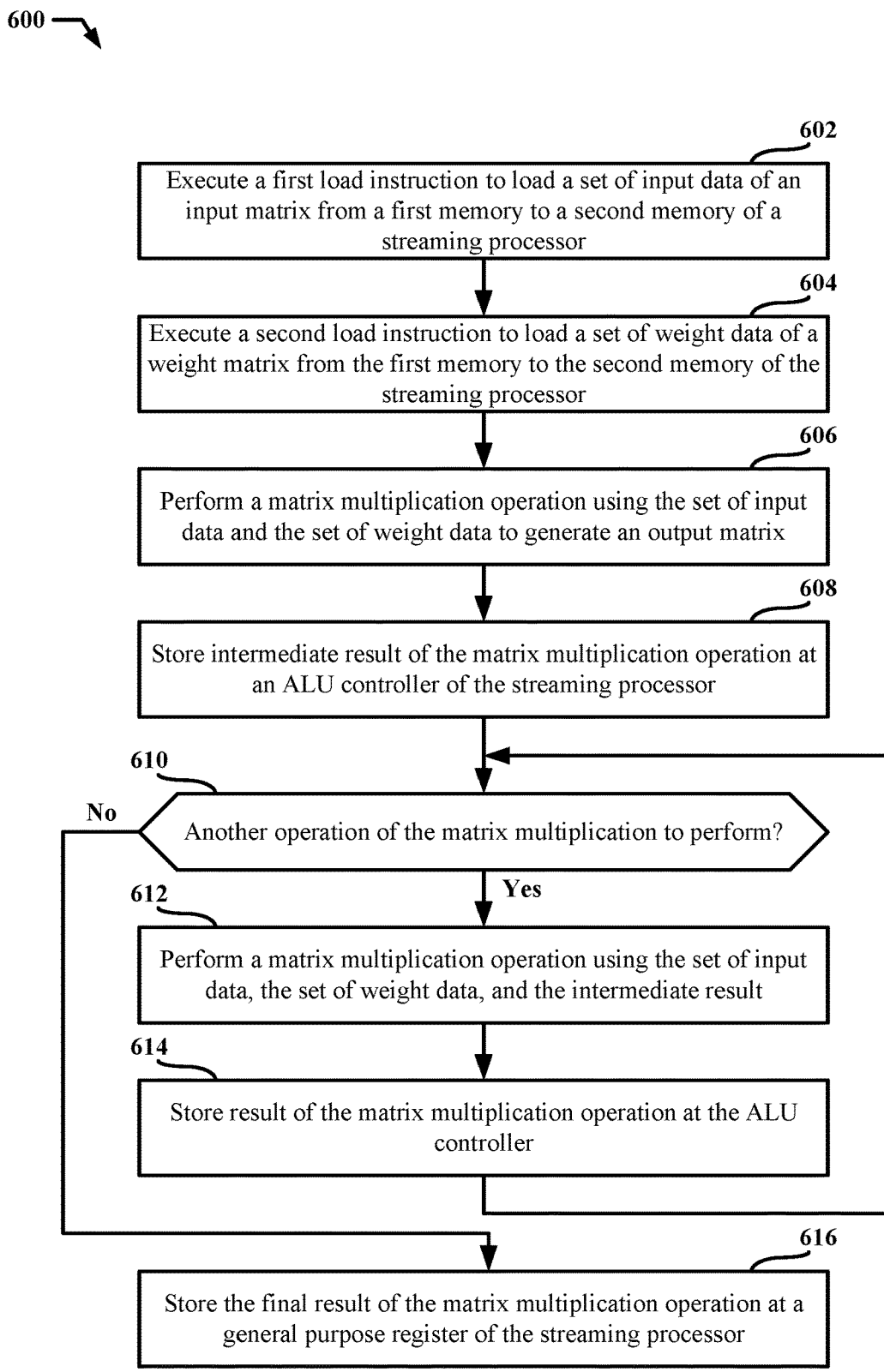
FIG. 6 illustrates an example flowchart of an example method, in accordance with one or more techniques of this disclosure.

FIG. 6 illustrates an example flowchart 600 of an example method in accordance with one or more techniques of this disclosure. The method may be performed by an apparatus, such as the device 104 of FIG. 1, a GPU, a graphics processor, a CPU, an application processor, a DPU, a display processor, a video processor, and/or a component of the device 104, such as the graphics processor 202 of FIG. 2 and/or the streaming processor 206 of FIG. 2.

At 602, the apparatus may execute a first load instruction to load a set of input data of an input matrix from a first memory to a second memory of a streaming processor, as described in connection with the examples of FIGS. 1, 2, 3, 4, and/or 5. For example, the DMA component 230 of the load control unit 218 may be configured to execute a first block load instruction to load a block of input elements of the input matrix 302 from the graphics processor 202 to a memory (e.g., the GPR 220) of the steaming processor 206, as described in connection with 530 of FIG. 5. Further, matrix multiplication handling component 198 may perform 602. In some examples, the input matrix 302 includes a first number of rows (e.g., Rows_a) and a first number of columns (e.g., Columns_a). In some examples, executing the first load instruction may include fetching the set of input elements of the input matrix 302 using a first pattern. In some examples, using the first pattern includes accessing input elements at contiguous memory addresses. In some examples, at least one of the first number of rows (e.g., Rows_a) and the first number of columns (e.g., Columns_a) is greater than one. In some examples, the first load instruction may be fetched, by the load control unit from a local memory of the streaming processor (e.g., the instruction cache 212) or a shared memory accessible to the streaming processor (e.g., the graphics memory 208 and/or the memory 124).

At 604, the apparatus may execute a second load instruction to load a set of weight data of a weight matrix from the first memory to the second memory of the streaming processor, as described in connection with the examples of FIGS. 1, 2, 3, 4, and/or 5. For example, the DMA component 230 of the load control unit 218 may be configured to execute a second block load instruction to load a block of weight elements of the weight matrix 304 from the graphics processor 202 to a memory (e.g., the local buffer 216) of the streaming processor 206, as described in connection with 520 of FIG. 5. Further, matrix multiplication handling component 198 may perform 604. In some examples, the weight matrix 304 includes a second number of rows (e.g., Rows_b) and a second number of columns (e.g., Columns_b). In some examples, executing the second load instruction may include fetching the set of weight elements of the weight matrix 304 using a second pattern. In some examples, using the second pattern includes accessing weight elements at contiguous memory addresses. In some examples, at least one of the second number of rows (e.g., Rows_b) and the second number of columns (e.g., Columns_b) is greater than one. In some examples, the second load instruction may be fetched, by the load control unit from a local memory of the streaming processor (e.g., the instruction cache 212) or a shared memory accessible to the streaming processor (e.g., the graphics memory 208 and/or the memory 124).

In some examples, a size of the set of input data is based on a wave size, and a size of the set of weight data is based on the wave size. In some examples, the wave size corresponds to a plurality of fibers, and where each output of an output matrix corresponds to execution of a respective fiber. In some examples, the wave size may be a pre-defined configuration.

At 606, the apparatus may perform a matrix multiplication operation using the set of input data and the set of weight data to generate an output matrix, as described in connection with FIGS. 1, 2, 3, 4, and/or 5. For example, the ALU controller 210 may instruct the ALU component 214 to execute an operation corresponding to an instruction of a fiber, as described in connection with 540 of FIG. 5. Further, matrix multiplication handling component 198 may perform 606. In some examples, the performing of the matrix multiplication operation may include a plurality of operations corresponding to a dot product operation. In some such examples, the dot product operation may include a plurality of multiplication operations and a plurality of accumulation operations, such as multiply-addition operations.

At 608, the apparatus may store the intermediate result of the matrix multiplication operation at an ALU controller of the streaming processor, as described in connection with FIGS. 1, 2, 3, 4, and/or 5. For example, the ALU component 214 may execute the matrix multiplication operation (e.g., a multiplication operation, an addition operation, a multiply-addition operation, etc.) and store the output of the matrix multiplication operation at the MM component 232 of the ALU controller 210, as described in connection with 550c of FIG. 5. Further, matrix multiplication handling component 198 may perform 608.

At 610, the apparatus may determine whether there is another operation of the matrix multiplication operation to perform, as described in connection with FIGS. 1, 2, 3, 4, and/or 5. For example, the ALU controller 210 may determine whether the execution of the fiber includes another operation to perform. Further, matrix multiplication handling component 198 may perform 610.

If, at 610, the apparatus determines that there is another operation of the matrix multiplication operation to perform, then, at 612, the apparatus may perform a matrix multiplication operation using the set of input data, the set of weight data, and the intermediate result, as described in connection with FIGS. 1, 2, 3, 4, and/or 5. For example, the ALU controller 210 may re-input the intermediate result from the MM component 232 to the ALU component 214 to perform a multiply-addition operation, as described in connection with 550 of FIG. 5. Further, matrix multiplication handling component 198 may perform 612. In some such examples, the first operand (op1) of the multiply-addition operation may be an element of the input data, the second operand (op2) of the multiply-addition operation may be an element of the weight data, and the third operand (op3) of the multiply-addition operation may be the intermediate result.

At 614, the apparatus may store the result of the matrix multiplication operation at the ALU controller, as described in connection with FIGS. 1, 2, 3, 4, and/or 5. For example, the ALU component 214 may be configured to store an intermediate result of the matrix multiplication operation at the MM component 232 of the ALU controller 210, as described in connection with 550c of FIG. 5. Control may then return to 610 to determine if there is another operation of the matrix multiplication to perform. Further, matrix multiplication handling component 198 may perform 614.

If, at 610, the apparatus determines that there is not another operation of the matrix multiplication operation to perform, then, at 616, the apparatus may store the final result of the matrix multiplication operation at a general purpose register of the streaming processor, as described in connection with FIGS. 1, 2, 3, 4, and/or 5. For example, the ALU component 214 may store the final result at the GPR 220, as described in connection with 550e of FIG. 5. Further, matrix multiplication handling component 198 may perform 616. In some examples, the final result may be loaded from the GPR 220 to the graphics memory 208 by the load control unit 218, as described in connection with 560 of FIG. 5.

In one configuration, a method or apparatus for compute processing is provided. The apparatus may be a processing unit, a GPU, a graphics processor, an application processor, a CPU, a display processor, a display processing unit (DPU), a video processor, or some other processor that can perform compute processing. In some examples, the apparatus may be the processing unit 120 within the device 104, or may be some other hardware within the device 104, or another device. For example, one or more aspects of the apparatus may be implemented by the example streaming processor 206 of FIG. 2. The apparatus may include means for executing, with a load control unit of a streaming processor, a first load instruction to load a set of input data of an input matrix from a first memory to a second memory of the streaming processor, and where the input matrix comprises a first number of rows and a first number of columns. The apparatus may also include means for executing, with the load control unit, a second load instruction to load a set of weight data of a weight matrix from the first memory to the second memory, and where the weight matrix comprises a second number of rows and a second number of columns. The apparatus may also include means for performing, with an arithmetic logic unit (ALU) component of the streaming processor, a matrix multiplication operation using the set of input data and the set of weight data to generate an output matrix having the first number of rows and the second number of columns, where each element of the output matrix represents a dot product of a plurality of elements of a row of the set of input data and a column of the set of weight data, and where the dot product includes a plurality of multiplication operations and accumulation operations resulting in respective intermediate results that are re-input to the ALU component for a subsequent operation of the dot product. The apparatus may also include means for storing the output matrix at a general purpose register of the streaming processor, and where the general purpose register is configured to be accessible to the ALU component.

In some examples, the apparatus may include means for outputting the intermediate results from the ALU component to an ALU controller, and where respective intermediate results are re-input from the ALU controller to the ALU component for executing the subsequent operation and includes foregoing accessing of the general purpose register for the executing of the subsequent operation.

In some examples, the apparatus may include means for executing the first load instruction including loading, with the load control unit, a first block of elements at memory addresses of the first memory using a first pattern, and where the first block of elements corresponds to the set of input data of the input matrix. The example apparatus may also include means for executing the second load instruction including loading, with the load control unit, a second block of elements at memory addresses of the first memory using a second pattern, and where the second block of elements corresponds to the set of weight data of the weight matrix.

In some examples, the apparatus includes means for using at least one of the first pattern or the second pattern by accessing elements that are at contiguous memory addresses at the second memory.

In some examples, the apparatus includes means for executing the first load instruction by loading the set of input data from the first memory to the general purpose register.

In some examples, the apparatus includes means for fetching, with the load control unit, the first load instruction from a local memory or a shared memory.

The subject matter described herein can be implemented to realize one or more benefits or advantages. For instance, the described compute processing techniques can be used by a graphics processor, a GPU, an application processor, a CPU, a display processor, a DPU, a video processor, or some other processor that can perform compute processing to implement the improving of performing matrix multiplication operations in a streaming processor, reduce the load of a processing unit (e.g., any processing unit configured to perform one or more techniques disclosed herein, such as a graphics processor, a GPU, an application processor, a CPU, a display processor, a DPU, and the like), and/or reduce power consumption of the processing unit. In general, examples disclosed herein provide techniques for improving the performing of matrix multiplication operations in a streaming processor by employing techniques for reducing memory access latencies, by employing techniques for improving the loading of data from a graphics memory to a local memory of the streaming processor, and/or by employing techniques for increasing utilization of an ALU component of the streaming processor.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

The following aspects are illustrative only and may be combined with other aspects or teachings described herein, without limitation.

Aspect 1 is a method of performing data processing, comprising: executing, with a load control unit of a streaming processor, a first load instruction to load a set of input data of an input matrix from a first memory to a second memory of the streaming processor, the input matrix comprising a first number of rows and a first number of columns; executing, with the load control unit, a second load instruction to load a set of weight data of a weight matrix from the first memory to the second memory, the weight matrix comprising a second number of rows and a second number of columns; performing, with an ALU component of the streaming processor, a matrix multiplication operation using the set of input data and the set of weight data to generate an output matrix having the first number of rows and the second number of columns, each element of the output matrix representing a dot product of a plurality of elements of a row of the set of input data and a column of the set of weight data, the dot product including a plurality of multiplication operations and accumulation operations resulting in respective intermediate results that are re-input to the ALU component for a subsequent operation of the dot product; and storing the output matrix at a general purpose register of the streaming processor, the general purpose register configured to be accessible to the ALU component.

Aspect 2 is the method of aspect 1, further including that the respective intermediate results are output from the ALU component to an ALU controller, and where the respective intermediate results are re-input from the ALU controller to the ALU component for executing the subsequent operation and includes foregoing accessing of the general purpose register for the executing of the subsequent operation.

Aspect 3 is the method of any of aspect 1 or aspect 2, further including that executing the first load instruction comprises loading, with the load control unit, a first block of elements at memory addresses of the first memory using a first pattern, the first block of elements corresponding to the set of input data of the input matrix, and where executing the second load instruction comprises loading, with the load control unit, a second block of elements at memory addresses of the first memory using a second pattern, the second block of elements corresponding to the set of weight data of the weight matrix.

Aspect 4 is the method of any of aspects 1 to 3, further including that using at least one of the first pattern or the second pattern comprises accessing elements that are at contiguous memory addresses at the second memory.

Aspect 5 is the method of any of aspects 1 to 4, further including that a size of the set of input data of the input matrix is based on a wave size, and where a size of the set of weight data of the weight matrix is based on the wave size.

Aspect 6 is the method of any of aspects 1 to 5, further including that the wave size corresponds to a plurality of fibers, and where each output of the output matrix corresponds to execution of a respective fiber.

Aspect 7 is the method of any of aspects 1 to 6, further including that the second memory comprises the general purpose register, and where executing the first load instruction comprises loading the set of input data from the first memory to the general purpose register.

Aspect 8 is the method of any of aspects 1 to 7, further including that at least one of the first number of rows and the first number of columns is greater than one, and where at least one of the second number of rows and the second number of columns is greater than one.

Aspect 9 is the method of any of aspects 1 to 8, further including fetching, with the load control unit, the first load instruction from a local memory or a shared memory.

Aspect 10 is an apparatus for wireless communication including at least one processor coupled to a memory and configured to implement a method as in any of aspects 1 to 9.

Aspect 11 is an apparatus for wireless communication including means for implementing a method as in any of aspects 1 to 9.

Aspect 12 is a computer-readable medium (e.g., a non-transitory computer-readable medium) storing computer executable code, where the code, when executed, causes a processor to implement a method as in any of aspects 1 to 9.

What is claimed is:

1. An apparatus for data processing, comprising:
   at least one memory; and
   at least one processor coupled to the at least one memory and configured to:
   fetch an element of an input matrix from graphics memory;
   determine whether the element of the input matrix is to be used across multiple threads; and
   store the element of the input matrix at a buffer until a workgroup corresponding to at least one of the multiple threads is executed in response to a first determination that the element of the input matrix is to be used across multiple threads, or store the element of the input matrix at a general purpose register (GPR) in response to a second determination that the element of the input matrix is not to be used across multiple threads.

2. The apparatus of claim 1, wherein the at least one processor is further configured to:
   broadcast the element of the input matrix when a thread in the multiple threads is executed.

3. The apparatus of claim 1, wherein to determine whether the element of the input matrix is to be used across the multiple threads, the at least one processor is configured to:
   determine that the element of the input matrix is not to be used across the multiple threads, and wherein to store the element of the input matrix at the buffer or at the GPR based on the determination, the at least one processor is configured to:
   store the element of the input matrix at the GPR based on the determination that the element of the input matrix is not to be used across the multiple threads.

4. The apparatus of claim 1, wherein the at least one processor is further configured to:
   fetch a first element of a weight matrix from the graphics memory; and
   store the first element of the weight matrix at the buffer.

5. The apparatus of claim 4, and wherein to store the element of the input matrix at the buffer, the at least one processor is configured to:
   store the element of the input matrix at the buffer in a pattern that is based on matrix multiplication, and wherein to store the first element of the weight matrix at the buffer, the at least one processor is configured to:
   store the first element of the weight matrix at the buffer in the pattern that is based on the matrix multiplication.

6. The apparatus of claim 4, wherein the at least one processor is further configured to:
   perform, via the multiple threads, a matrix multiplication operation with respect to the element of the input matrix and the first element of the weight matrix.

7. The apparatus of claim 1, wherein to fetch the element of the input matrix from the graphics memory, the at least one processor is configured to;
   fetch the element of the input matrix from the graphics memory via a single block load instruction.

8. The apparatus of claim 1, wherein the apparatus is a wireless communication device comprising a transceiver.

9. The apparatus of claim 1, wherein, to determine whether the element of the input matrix is to be used across multiple threads, the at least one processor is configured to:
   determine that the element of the input matrix is to be used across multiple threads, wherein, to store the element of the input matrix at the buffer until the workgroup corresponding to at least one of the multiple threads is executed in response to the first determination that the element of the input matrix is to be used across multiple threads, or store the element of the input matrix at the GPR in response to the second determination that the element of the input matrix is not to be used across multiple threads, the at least one processor is configured to:
   store the element of the input matrix at the buffer until the workgroup corresponding to at least one of the multiple threads is executed in response to the determination that the element of the input matrix is to be used across multiple threads.

10. The apparatus of claim 9, wherein the at least one processor is further configured to:
    fetch a second element of the input matrix from graphics memory;
    determine that the second element of the input matrix is not to be used across multiple threads; and
    store the second element of the input matrix at the GPR in response to the determination that the second element of the input matrix is not to be used across multiple threads.

11. A method of data processing, comprising:
    fetching an element of an input matrix from graphics memory;
    determining whether the element of the input matrix is to be used across multiple threads; and
    storing the element of the input matrix at a buffer until a workgroup corresponding to at least one of the multiple threads is executed in response to a first determination that the element of the input matrix is to be used across multiple threads, and or storing the element of the input matrix at a general purpose register (GPR) in response to a second determination that the element of the input matrix is not to be used across multiple threads.

12. The method of claim 11, further comprising:
    broadcasting the element of the input matrix when a thread in the multiple threads is executed.

13. The method of claim 11, wherein determining whether the element of the input matrix is to be used across the multiple threads comprises:
    determining that the element of the input matrix is not to be used across the multiple threads, and wherein storing the element of the input matrix at the buffer or at the GPR based on the determination comprises:

storing the element of the input matrix at the GPR based on the determination that the element of the input matrix is not to be used across the multiple threads.

14. The method of claim 11, further comprising:
fetching a first element of a weight matrix from the graphics memory; and
storing the first element of the weight matrix at the buffer.

15. The method of claim 14, and wherein storing the element of the input matrix at the buffer comprises:
storing the element of the input matrix at the buffer in a pattern that is based on matrix multiplication, and wherein storing the first element of the weight matrix at the buffer comprises:
storing the first element of the weight matrix at the buffer in the pattern that is based on the matrix multiplication.

16. The method of claim 14, further comprising:
performing, via the multiple threads, a matrix multiplication operation with respect to the element of the input matrix and the first element of the weight matrix.

17. The method of claim 11, wherein fetching the element of the input matrix from the graphics memory comprises:
fetching the element of the input matrix from the graphics memory via a single block load instruction.

18. At least one non-transient computer-readable medium storing computer executable code for data processing, comprising code to:
fetch an element of an input matrix from graphics memory;
determine whether the element of the input matrix is to be used across multiple threads; and
store the element of the input matrix at a buffer until a workgroup corresponding to at least one of the multiple threads is executed in response to a first determination that the element of the input matrix is to be used across multiple threads, and or store the element of the input matrix at a general purpose register (GPR) in response to a second determination that the element of the input matrix is not to be used across multiple threads.

\* \* \* \* \*